United States Patent
Woltermann et al.

(10) Patent No.: US 11,669,095 B2
(45) Date of Patent: Jun. 6, 2023

(54) METHOD FOR THE DRIVERLESS OPERATION OF A VEHICLE

(71) Applicant: DAIMLER AG, Stuttgart (DE)

(72) Inventors: Bernd Woltermann, Fellbach (DE); Fabian Andreas Rainer Ventzke, Stuttgart (DE); Clemens Severin Tiedeken, Stuttgart (DE); Pascal Dauer, Stuttgart (DE); Frieder Sönning, Stuttgart (DE); Louisa Koch, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 311 days.

(21) Appl. No.: 17/273,097

(22) PCT Filed: Jul. 30, 2019

(86) PCT No.: PCT/EP2019/070435
§ 371 (c)(1),
(2) Date: Mar. 3, 2021

(87) PCT Pub. No.: WO2020/048684
PCT Pub. Date: Mar. 12, 2020

(65) Prior Publication Data
US 2021/0318684 A1     Oct. 14, 2021

(30) Foreign Application Priority Data
Sep. 3, 2018   (DE) .................... 10 2018 006 949.5

(51) Int. Cl.
*G05D 1/02*      (2020.01)
*B60W 50/00*     (2006.01)
*G01C 21/36*     (2006.01)

(52) U.S. Cl.
CPC ....... *G05D 1/0214* (2013.01); *B60W 50/0097* (2013.01); *G01C 21/3691* (2013.01);
(Continued)

(58) Field of Classification Search
CPC ......... G05D 1/0214; G05D 2201/0213; G05D 1/0027; B60W 50/0097; B60W 2552/50;
(Continued)

(56) References Cited

U.S. PATENT DOCUMENTS

| 8,996,224 B1 | 3/2015 | Herbach et al. |
| 9,008,890 B1 | 4/2015 | Herbach et al. |

(Continued)

FOREIGN PATENT DOCUMENTS

| DE | 102012021282 A1 | 4/2014 |
| DE | 102016203086 A1 | 8/2017 |
| WO | 2018106755 A1 | 6/2018 |

OTHER PUBLICATIONS

International Search Report dated Oct. 31, 2019 in related/corresponding International Application No. PCT/EP2019/070435.
(Continued)

*Primary Examiner* — Rodney A Butler
(74) *Attorney, Agent, or Firm* — Patent Portfolio Builders PLLC

(57) ABSTRACT

When a vehicle performing driverless operation of encounters a blockade situation, a probable blockade time duration of the blockade situation is predicted based on a situational analysis. Support by a teleoperator is requested when the predicted blockade time duration of the blockade situation is greater than a predetermined time duration or when the vehicle has waited longer than the predicted blockade time duration for a resolution of the blockade situation.

8 Claims, 1 Drawing Sheet

(52) U.S. Cl.
CPC ... *B60W 2552/50* (2020.02); *B60W 2554/402* (2020.02); *G05D 2201/0213* (2013.01)

(58) Field of Classification Search
CPC ......... B60W 2554/402; G01C 21/3691; G08G 1/096838
See application file for complete search history.

(56) References Cited

U.S. PATENT DOCUMENTS

| | | |
|---|---|---|
| 9,442,489 B2 | 9/2016 | Reichel et al. |
| 9,465,388 B1 | 10/2016 | Fairfield et al. |
| 2017/0090480 A1 | 3/2017 | Ho et al. |
| 2018/0136651 A1* | 5/2018 | Levinson .............. B60W 30/00 |
| 2019/0137287 A1* | 5/2019 | Pazhayampallil ..... G01C 21/30 |

OTHER PUBLICATIONS

Written Opinion dated Oct. 31, 2019 in related/corresponding International Application No. PCT/EP2019/070435.

* cited by examiner

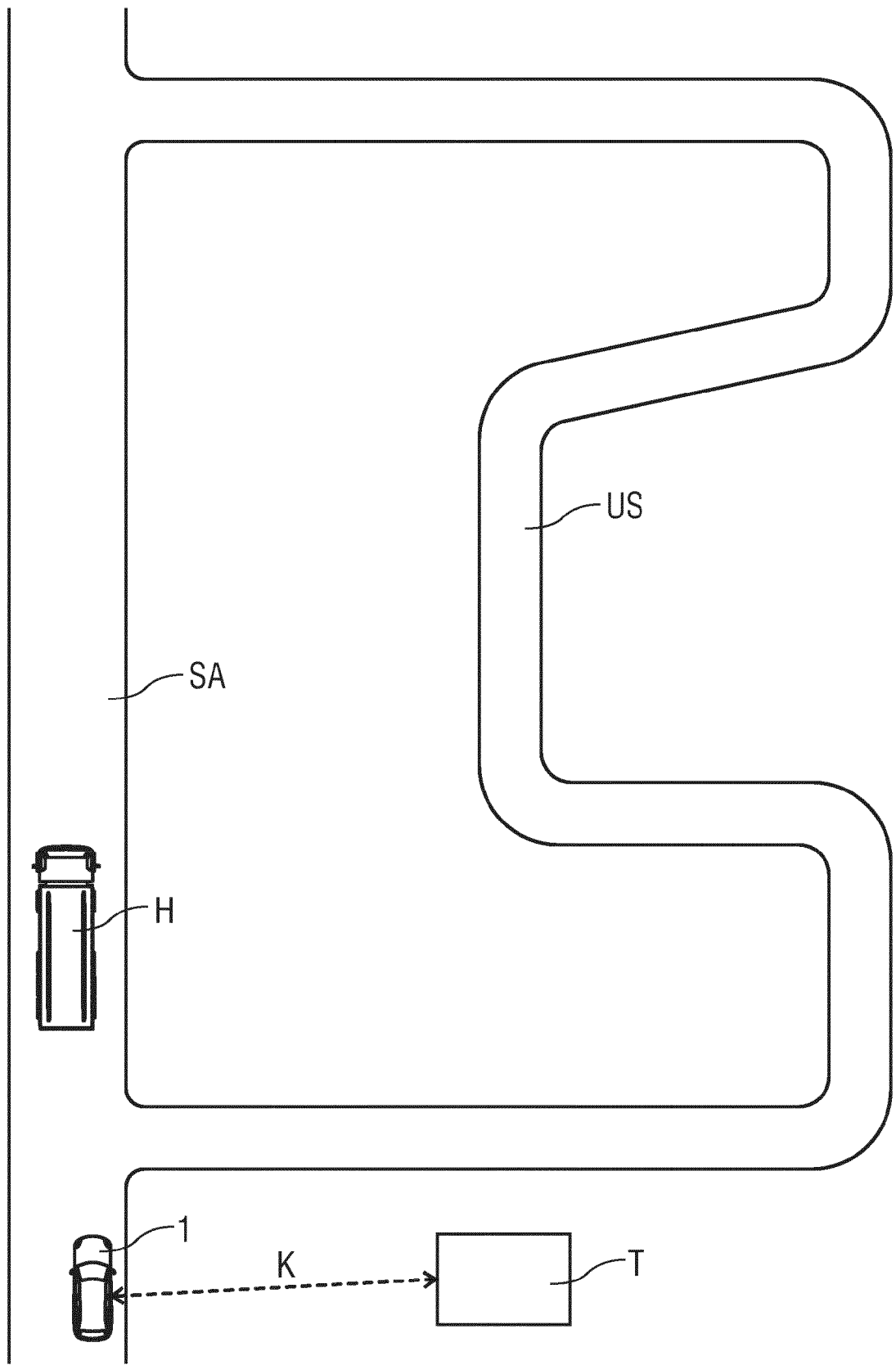

METHOD FOR THE DRIVERLESS OPERATION OF A VEHICLE

BACKGROUND AND SUMMARY OF THE INVENTION

Exemplary embodiments of invention relate to a method for the driverless operation of a vehicle.

Extended trajectories for autonomous vehicles are known from the prior art, as described in U.S. Pat. No. 9,008,890 B1. An autonomous vehicle comprises a blockade situation detection component and a communication component. The blockade situation detection component is configured to detect a state in which the autonomous vehicle is prevented from navigating according to a first trajectory. The communication component sends an assistance request signal to an assistance center and receives a response to the assistance request signal. The assistance request signal includes a piece of sensor information of the autonomous vehicle. The assistance center comprises a communication component and a trajectory specification component. The communication component receives the assistance request signal and sends a corresponding response. The trajectory specification component specifies a second trajectory for the autonomous vehicle and generates the corresponding response, which comprises a depiction of the second trajectory. The second trajectory is based on the first trajectory and ignores an object which blocks the first trajectory.

A method and a device for driver assistance are described in DE 10 2016 203 086 A1. In the method for driver assistance, an ego-vehicle automatically carries out a driving maneuver, wherein objects in the surroundings of the ego-vehicle are detected while the driving maneuver is being carried out. The objects are classified, wherein stationary objects forming constrictions and oncoming vehicles are classified. Subsequently, a prediction of the movement of the ego-vehicle and the movements of oncoming vehicles is carried out. Open spaces in the surrounding of the stationary objects forming constrictions are ascertained, and first blockade situations are ascertained in which an onward journey of the ego-vehicle at a constriction is no longer possible because of an oncoming vehicle, and/or second blockade situations are ascertained in which no end to the constriction can be detected by the ego-vehicle. When ascertaining a blockade situation, a stop position is determined at which the ego-vehicle stops until the blockade situation has been resolved.

Exemplary embodiments of the invention are directed to an improved method for the driverless operation of a vehicle in comparison to the prior art.

In a method for the driverless operation of a vehicle, according to the invention, when a blockade situation arises, an expected blockade time duration of the blockade situation is predicted based on a situational analysis, wherein support by a teleoperator is requested when the predicted blockade time duration of the blockade situation is greater than a predetermined time duration or when the vehicle has waited longer than the predicted blockade time duration for a resolution of the blockade situation and the blockade situation is then still not resolved.

In particular, the teleoperator is at least one person who is apart from the vehicle, in particular out of sight of the vehicle, for example in an assistance center several kilometers away. There is at least temporarily a bidirectional wireless communication connection between the teleoperator and the vehicle, via which the vehicle can request the support of the teleoperator and the teleoperator can support the vehicle. The support by the teleoperator can comprise, for example, instructions by the teleoperator to the vehicle and/or a route specification by the teleoperator to the vehicle and/or a control and/or regulation of a drivetrain, a steering device and/or a braking device of the vehicle by the teleoperator.

By means of the method according to the invention, when a respective blockade situation arises, the vehicle operated without a driver can itself decide whether or not support by the teleoperator is required. Thus, a burden on the teleoperator is clearly reduced, since their support is only still required when it is really necessary. In particular with blockade situations lasting for only a short amount of time, for example when a taxi stops, the vehicle itself can decide to wait until the blockade situation has been resolved. For example, the vehicle can also make the suggestion of further procedures to the teleoperator, for example a possible route for bypassing the blockade situation, and thus further reduce the burden of the teleoperator.

Furthermore, by means of the method according to the invention, unnecessarily long waiting times in such a blockade situation are avoided because, with a predicted blockade time duration that is too long or when it has waited for longer than the predicted blockade time duration, the vehicle requests the support of the teleoperator. A user of the vehicle thus clearly reaches their destination much more quickly because of the method according to the invention. In addition, costs in terms of the operation of the vehicle are reduced.

The predetermined time duration is, for example, a time duration which the vehicle would additionally need in order to bypass a route portion blocked by the blockade situation. In this way, no fixed time interval is predetermined, but rather the time duration is predetermined such that it is adjusted to a respectively present situation. If the predicted time duration is shorter than the time duration which the vehicle would additionally need in order to bypass the route portion blocked by the blockade situation, then it is reasonable for the vehicle to wait for the resolution of the blockade situation, since bypassing would, in all likelihood, not result in saving any time, yet would require higher drive energy consumption depending on the type of drive of the vehicle, i.e., for example, a higher fuel consumption or current consumption. The teleoperator's support for this decision is thus not necessary.

However, if the predicted time duration is longer than the time duration that the vehicle would additionally need in order to bypass the route portion blocked by the blockade situation, then this bypass could be reasonable even when a higher drive energy consumption would emerge as a result. In order to meet a final consideration in relation to this decision, the request for support by the teleoperator is thus reasonable. The teleoperator can then finally evaluate the present blockade situation, in particular by means of information about the blockade situation detected by means of a surroundings detection sensor system of the vehicle and/or by means of further information about the blockade situation possibly present to them and/or about a traffic situation on the bypass route, and can decide whether the vehicle should wait until the blockade situation has been resolved or should bypass the blockade situation.

With the variant in which support by the teleoperator is requested when the vehicle has waited longer than the predicted blockade duration of time for the resolution of the blockade situation, it can be provided, for example, that support by the teleoperator is immediately requested when the predicted blockade time duration is exceeded and the blockade situation is still not resolved, or for example is only requested when the predicted blockade time duration is exceeded by a predetermined absolute or relative value, in particular by a predetermined factor of the blockade time duration, and the blockade situation is not yet resolved. In the second process in which the vehicle still waits a while at the end of the blockade time duration and only thereafter requests support by the teleoperator, the vehicle unnecessarily contacting the teleoperator, in particular, is avoided in cases in which the predicted blockade time duration is only just exceeded. This is useful since an exact prediction of a respective blockade time duration is only very difficult or is not possible because of blockade situations that do not or only rarely exactly repeat.

The situational analysis is carried out, in particular based on a surroundings detection by means of the surroundings detection sensor system of the vehicle. This surroundings detection sensor system comprises, for example, an image detection sensor system, in particular with one or more cameras, and/or a Lidar sensor system with one or more Lidar sensors and/or a radar sensor system with one or more radar sensors and/or an ultrasound sensor system with one or more ultrasound sensors. Based on this surroundings detection by means of the surroundings detection sensor system, the vehicle evaluates a respectively present traffic situation, in particular the respectively present blockade situation, in which in particular a path of the vehicle is blocked by at least one stationary obstacle, for example another stationary vehicle or a different obstacle. In particular using the surroundings detection sensor system, it is known where the vehicle is in a respective road course and how the road further proceeds. Thus, an evaluation of the respectively present blockade situation and thus the prediction of the blockade time duration are made possible.

Alternatively, or additionally, the situational analysis can be carried out, for example, based on information that has been and/or is received via a vehicle-to-vehicle communication and/or vehicle-to-infrastructure communication.

In the situational analysis, a classification, for example, of one or more obstacles causing the blockade situation, i.e., responsible for the blockade situation, is undertaken. The obstacle in the path of the vehicle is thus classified, for example, in relation to different typical kinds of obstacles. Such typical kinds of obstacles are, for example, taxis, delivery vehicles, in particular parcel delivery vehicles, emergency vehicles, for example belonging to the police, fire brigade and the ambulance service, i.e., for example ambulances and emergency doctor vehicles, vehicles for waste disposal and/or for emptying refuse containers and/or recycled glass containers, typical barriers, for example beacons and/or barrier walls, and/or containers and/or other kinds of obstacles. By means of this classification of the respective obstacle, which causes the respective blockade situation, a realistic prediction of the blockade time duration can be carried out. Thus, for example with an obstacle classified as a taxi, a short blockade time duration, in particular caused by a passenger getting in or getting out, can be assumed. With an obstacle classified as an emergency vehicle, a longer blockade time duration can be assumed, since an incident situation with elaborate patient care, for example, is present. With a barrier, for example because of a building site, a very long blockade time duration of, for example, several days or longer can be assumed.

For example, in the situational analysis, a movement analysis of people in the surroundings of the obstacle or the obstacles is furthermore performed. Thus, the prediction of the blockade time duration can be improved. If, for example, the obstacle causing the blockade situation is classified as a parcel delivery vehicle and if, furthermore, a person moving in the direction of this obstacle is detected in its surroundings, then a substantially shorter blockade time duration can be predicted than if the person were moving away from this obstacle formed as a parcel delivery system. When the person is moving towards the parcel delivery vehicle, it can be assumed that a delivery process has already concluded and the parcel delivery vehicle will thus drive on shortly, whereby the blockade situation is resolved. When the person moves away from the parcel delivery vehicle, it is assumed that the parcel delivery process still has to take place, such that a correspondingly longer blockade time duration must be calculated.

The prediction of the blockade time duration of the blockade situation is carried out, for example, based on a previous learning process in which, in different blockade situations, support by the teleoperator has been requested, wherein, when the teleoperator in the respective blockade situation has decided that the vehicle should wait, a time duration until the resolution of the respective blockade situation has been ascertained and has been learned as the probable blockade time duration of this blockade situation. In this way, the vehicle is autodidactic and can constantly further optimize the prediction of the blockade time duration. With the respectively currently present blockade situation, results of the previous learning processes are thus used, wherein this learning process is advantageously constantly continued, such that the currently present blockade situation has an influence on this learning process, whereby a correspondingly improved result of the learning process is available for subsequent blockade situations.

With several blockade situations of the same type and various time durations until the resolution of these blockade situations, an average time duration until the resolution of these blockade situation has been, for example, and is advantageously learned in the continued learning process as the probable blockade time duration of this kind of blockade situation. The kinds of blockade situations can be distinguished, for example, by means of the classification of the obstacle or obstacles, which causes/cause the respective blockade situation, and/or by means of the movement analysis of people in the surroundings of the obstacle or obstacles. Thus, for the respective kinds of blockade situation, in each case a plurality of examples have an influence on the learning process, such that an average time duration can be ascertained, which enables a good prediction of the blockade time duration.

For example, support by the teleoperator is requested when it has been ascertained in the situational analysis that the blockade situation is caused by at least one stationary emergency vehicle with activated blue lights and/or by a barrier and/or by an unknown obstacle. In these cases, a very long and/or undetermined blockade time duration is predicted. In particular, this predicted blockade time duration is longer than the predetermined time duration, for example longer than the additional time duration for bypassing this blockade situation. Thus, an immediate request for support by the teleoperator is reasonable. Alternatively, in such cases or in one or more of the cases described, it can be provided, for example, that the blockade situation is directly bypassed without previously requesting the support of the teleoperator.

In a possible embodiment of the method, the blockade situation with its position is stored in a digital map and taken into consideration in future route planning. This can prevent the vehicle and/or possibly other vehicles that have access to this digital map from entering into this blockade situation again and having to correspondingly wait or request the assistance of the teleoperator again. Advantageously, further information about blockade situations is additionally stored, for example the emerging blockade time duration, a weekday and/or time of day of the blockade situation and/or the kind of blockade situation, in particular the classification of the obstacle or obstacles. Thus, this information can also be taken into consideration when planning the route, for example in blockade situations emerging only temporarily, for example only on certain weekdays and/or at certain times. By means of the classification of the obstacle or obstacles, a probability for a continuation and/or repetition of this blockade situation can also be ascertained. Thus, for example, the probability of a blockade situation caused by an emergency vehicle, for example an emergency doctor vehicle, persisting or being repeated is minimal, such that such blockade situations are not taken into consideration in future route planning, or only to a minimal extent, while other blockade situations, in which the probability of persistence and/or repetition, at least on certain weekdays and/or at certain times of day, is high, can be taken into consideration to a great extent when planning routes in the future, in particular when a corresponding autonomous journey of the vehicle falls on such a weekday and/or at such a time of day. Thus, a corresponding evaluation of the blockade situation is advantageously undertaken and taken into consideration when recording on the digital map and/or for evaluation of a relevance for future route planning.

Exemplary embodiments of the invention are explained in more detail below by means of the drawings.

BRIEF DESCRIPTION OF THE DRAWING FIGURE

Here are shown in

The sole FIGURE, schematically, a vehicle in a blockade situation.

DETAILED DESCRIPTION

The sole FIGURE shows a schematic depiction of a vehicle 1 in a driverless mode, i.e., in an autonomous driving mode without a vehicle driver present in the vehicle 1, which is in a blockade situation. In the depicted example, the vehicle 1 is on a narrow road which is blocked by an obstacle H in the form of another vehicle.

Were a vehicle driver to be present in the vehicle 1, then they would now reach a decision as to whether the blockade situation is to be bypassed or waited out until the blockade situation has resolved. For this, a human vehicle driver uses a plurality of mostly optical expedients. For example, they optically detect a type of the obstacle H, in the case depicted a type of the other vehicle, actions by people belonging to the other vehicle, for example a driver or passenger, and recognize typical actions of these people and/or detect the location and/or a current time of day in order to be able to evaluate the current blockade situation.

With vehicles 1 operated without a driver, in particular autonomously, such a decision was previously not possible which is why, in such blockade situations, they require intervention by a teleoperator T or wait until the blockade situation has been resolved. In particular, the vehicle 1 operated without a driver previously did not know in which cases they should contact the teleoperator T or should wait. Thus, either waiting times that are too long emerge or the teleoperator T is burdened with a plurality of support requests.

By means of the method described below for the driverless operation of the vehicle 1, this is avoided since the method makes it possible for the vehicle 1, depending on the respectively present blockade situation, to decide whether it should request the support of the teleoperator T or whether it should wait until the blockade situation has been resolved.

To do so, when the respective blockade situation emerges, a probable blockade time duration of the respective blockade situation is predicted based on a situational analysis. Support by the teleoperator T, in particular via an at least temporarily existing bidirectional wireless communication connection K between the driverless vehicle 1 and the teleoperator T, is requested when the predicted blockade time duration of the blockade situation is greater than a predetermined time duration or when the vehicle 1 has waited longer than the predicted time duration for the resolution of the blockade situation, for example when the predicted blockade time duration has already been exceeded by a predetermined factor and the blockade situation has still not been resolved.

The teleoperator T can then analyze the present blockade situation and make a decision as to whether the vehicle 1 should wait, in particular until the blockade situation has been resolved, or whether the vehicle 1 should bypass the blockade situation, in particular on the bypass route US.

The predetermined time duration is ascertained, for example, as a time duration which the vehicle 1 would additionally need in order to bypass a route portion SA blocked by the blockade situation. This predetermined time duration thus preferably corresponds to the difference of a journey time required for a bypass route US and a journey time required for a route portion SA if the blockade situation were not present.

The prediction of the blockade time duration of the blockade situation is carried out, for example, based on a learning process. In this learning process, in different blockade situations, support by the teleoperator T is requested. When the teleoperator T decides in the respective blockade situation that the vehicle 1 should wait, a time duration until the resolution of the respective blockade situation is ascertained and learned as the probable blockade time duration of this blockade situation. This learned probable blockade situation is then used in a later blockade situation, in particular in the same blockade situation, for example in the blockade situation depicted here, as the predicted blockade time duration or is used to predict the blockade time duration. With several similar blockade situations during the learning process, an average time duration, for example, until the respective blockade situation is resolved is formed and learned as the probable blockade time duration of this blockade situation.

Thus, in this learning process, advantageously based on typical blockade situations and here, in particular, information detected by means of a surroundings detection sensor system of the vehicle 1, an algorithm is executed in order to enable the prediction of the blockade time duration and, based on this, to make a decision as to whether the support of the teleoperator T is requested because the probability of a long blockade time duration is very high or whether it can wait until the blockade situation has been resolved.

The situational analysis is based, in particular, on a surroundings detection by means of the surroundings detection sensor system of the vehicle 1. Based on this surroundings detection by means of the surroundings detection sensor system, the vehicle 1 operated without a driver, in particular autonomously, evaluates the present traffic situation, in particular the blockade situation, in which a path of the vehicle 1 is blocked by the stationary obstacle H, in the depicted example by the other stationary vehicle. By means of the surroundings detection sensor system, it is known here where the vehicle 1 is on a respective road course and how the road proceeds. Thus, an evaluation of the respectively present blockade situation and thus the prediction of the blockade time duration is made possible.

During the situational analysis, for example, a classification of the obstacle H or the obstacles H causing the blockade situation and a movement analysis of the person or people in the surroundings of the obstacle H or obstacles H is undertaken. Based on the classification of the respective obstacle H, an assessment of the blockade situation appropriate to the situation can be undertaken. Thus, for example, a typical blockade situation caused by a taxi as the obstacle H is different from a blockade situation caused by a delivery vehicle, in particular a parcel delivery vehicle, as the obstacle H, and these two blockade situations are different from a blockade situation caused by a construction site vehicle as the obstacle H.

The obstacle H in the path of the vehicle 1 is thus classified in terms of the different typical kinds of obstacle, for example. Such typical kinds of obstacle are, for example, taxis, delivery vehicles, in particular parcel delivery vehicles, emergency vehicles, for example belonging to the police, fire brigade and ambulance service, i.e., for example ambulances and emergency doctor vehicles, vehicles for waste disposal and/or for emptying refuse containers and/or recycled glass containers, typical barriers, for example beacons and/or barrier walls, and/or containers and/or other kinds of obstacles.

In addition, advantageously, further information of the surroundings detection sensor system of the vehicle 1 is used, for example a pedestrian detection system, in order to detect people in the surroundings of the obstacle H, as already mentioned, in particular people moving away from the obstacle H or towards the obstacle H, in particular when the obstacle H is another vehicle. Thus, the movement analysis of this person mentioned above is made possible.

Furthermore, by means of the surroundings detection sensor system of the vehicle 1, for example by means of a radar sensor, it can also be recognized, for example, whether there are further stationary or moving vehicles before the obstacle H. This can also contribute to the realistic evaluation of the blockade situation and thus to a realistic prediction of the blockade time duration.

Thanks to the classification of the obstacle H that caused the blockade situation and the movement analysis of people in the surroundings of the obstacle H, a realistic prediction of the blockade time duration can be carried out. Thus, for example with an obstacle H classified as a taxi, a short blockade time duration, in particular caused by a passenger getting in or getting out, can be assumed. With an obstacle H classified as an emergency vehicle, a longer blockade time duration can be assumed because an incident situation with elaborate patient care, for example, is present. With a barrier, for example because of a building site, a very long blockade time duration of, for example, several days or longer can be assumed.

Thus if, for example, a parcel delivery vehicle is recognized as the obstacle H and, by means of the surroundings detection sensor system of the vehicle 1, a person in the surroundings of this obstacle H is recognized who is moving from this obstacle H formed as a parcel delivery system in the direction of a house, it can be concluded from this that a parcel delivery process has only just started, such that the blockade time duration can still last longer. Thus, in such a blockade situation, a correspondingly longer blockade time duration is predicted with this ascertained information of the surroundings detection sensor system and the classification of the obstacle H as well as the movement analysis of the person in the surroundings of the vehicle 1. If this predicted blockade time duration exceeds the predetermined time duration which emerges, for example, for the additionally required time duration for bypassing the blocked route portion SA via the bypass stretch US because of a rerouting, then support by the teleoperator T is requested.

In a variant of this example, if a person who is approaching this obstacle H in the surroundings of this obstacle H formed as a parcel delivery vehicle is recognized by means of the surroundings detection sensor system of the vehicle 1, it can be concluded from this that the parcel delivery process has ended and the blockade situation will thus shortly be resolved. Thus, with such a blockade situation, a correspondingly short blockade time duration is predicted with this ascertained information of the surroundings detection sensor system and the classification of the obstacle H as well as the movement analysis of the person in the surroundings of the vehicle 1, the time duration in most cases not exceeding the predetermined time duration. Thus, support by the teleoperator T is not requested, but rather the vehicle 1 waits until the blockade situation has been resolved. However, if the vehicle 1 has waited longer than the predicted blockade time duration for the resolution of the blockade situation and the blockade situation has not been resolved, support by the teleoperator T is requested. In this way, waiting times that are too long as a result of incorrect assessment of the present blockade situation are avoided.

If, for example, an emergency vehicle is recognized as the obstacle H, for example, an ambulance with activated blue lights, it can be assumed that the blockade situation will last longer. The blockade time duration predicted because of this thus usually exceeds the predetermined time duration which emerges, for example, from the additionally required time duration for bypassing the blocked route portion SA via the bypass stretch US because of a rerouting. Thus, in such a case, support by the teleoperator T is requested and bypassing the blocked route portion SA via the bypass stretch US is proposed. Alternatively, in such a case, it can be provided that the driverless vehicle 1 directly bypasses the blockade situation, i.e., the blocked route portion SA, without requesting support by the teleoperator T in advance.

If, for example, a taxi is recognized as the obstacle H, as already mentioned, a short blockade time duration, in particular caused by a passenger getting in or getting out, can be assumed. Thus, with such a blockade situation, a correspondingly short blockade time duration is predicted with this ascertained information of the surroundings detection sensor system and the classification of the obstacle H, the time duration in most cases not exceeding the predetermined time duration. Thus, support by the teleoperator T is not requested, but rather the vehicle 1 waits until the blockade situation has been resolved. However, if the vehicle 1 has waited longer than the predicted blockade time duration for the resolution of the blockade situation and the blockade situation has not been resolved, support by the teleoperator T is requested in order to avoid waiting times that are too long due to an incorrect assessment of the present blockade situation.

If, for example, a barrier, for example in the form of barrier beacons, is recognized as the obstacle H, it can be assumed that the blockade situation will last longer. The blockade time duration predicted as a result of this thus usually exceeds the predetermined time duration which emerges, for example, from the additionally required time duration for bypassing the blocked route portion SA via the bypass stretch US because of rerouting. Thus, in such a case, even when the bypass stretch US is connected with a clearly longer journey time than the blocked route portion SA, support by the teleoperator T is requested and bypassing the blocked route portion SA via the bypass stretch US is proposed, or the driverless vehicle 1 directly bypasses the blocked route portion SA in such a case without requesting support by the teleoperator T in advance.

With an unknown obstacle, i.e., when it cannot be classified, support by the teleoperator T is expediently directly requested. Because of this unknown obstacle H, the blockade situation cannot be evaluated, such that a blockade situation of unknown length has to be assumed. Expediently, in such a case, the blockade time duration is thus predicted to be long in such a way that, in any case, support by the teleoperator T must be requested, in particular since, in any case, the predicted blockade time duration is greater than the predetermined time duration which, for example, is based on bypassing the blocked route portion SA via the bypass stretch US.

The blockade situations detected by the vehicle 1 are advantageously noted on a map with their position and with the actual blockade time duration or waiting time of the vehicle 1, when it has waited until the resolution of the blockade situation, and advantageously with a typical occurrence, for example due to a respective weekday and/or a respective time of day, and can thus be taken into consideration when respectively planning the route. In this way, it is automatically learned, for example, that, on a specific weekday, for example Mondays, a large number of obstacles H in the form of delivery vehicles is present in the morning on a narrow road with many shops, and thus long blockade time durations must be calculated. If this is taken into consideration when route planning, a different route can be chosen on corresponding weekdays and at corresponding times of the day which bypasses these possible blockade situations.

With this storing of such blockade situations on the map and/or with its consideration when route planning, an evaluation of the blockade situations is advantageously undertaken, such that, for example, blockade situations due to rare events, such as caused by emergency vehicles, for example ambulances with activated blue lights, for example because of an emergency incident, cannot be over-evaluated and do not lead to an amended route planning, such that a route portion SA blocked because of such a rare blockade situation is further used in the future. That is to say, with this storing of the blockade situation on the map and/or with its consideration when route planning, expediently, an evaluation is constantly undertaken as to whether it is a kind of blockade situation emerging often, in particular regularly, or a kind of blockade situation emerging rarely.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for driverless operation of a vehicle, the method comprising:
    operating the vehicle using the driverless operation;
    determining that a blockade situation occurs;
    conducting a situational analysis of the vehicle, wherein the situational analysis involves classifying one or more obstacles causing the blockage situation;
    predicting, responsive to the determination that the blockade situation occurs, a probable blockade time duration of the blockade situation based on the situational analysis of the vehicle;
    determining, by the vehicle, whether to request support by a teleoperator based on whether the predicted blockade time duration of the blockade situation is greater than a predetermined time duration or when the vehicle has waited longer than the predicted blockade time duration for a resolution of the blockade situation, wherein the predetermined time duration is a time duration which the vehicle would additionally require in order to bypass a route portion blocked by the blockade situation; and
    requesting, by the vehicle, support by the teleoperator when the predicted blockade time duration of the blockade situation is greater than the predetermined time duration or when the vehicle has waited longer than the predicted blockade time duration for the resolution of the blockade situation.

2. The method of claim 1, wherein the vehicle determines whether the support by the teleoperator is to be requested when the predicted blockade time duration is exceeded by a predetermined factor and the blockade situation has still not been resolved, and the vehicle requests the support by the teleoperator when the predicted blockade time duration is exceeded by the predetermined factor and the blockade situation has still not been resolved.

3. The method of claim 1, wherein the situational analysis is carried out based on a surroundings detection by a surroundings detection sensor system of the vehicle.

4. The method of claim 1, wherein the situational analysis also involves a movement analysis of people in surroundings of the obstacles.

5. The method of claim 1, wherein the prediction of the blockade time duration of the blockade situation is performed based on a previous learning process in which, in different blockade situations, support by the teleoperator has been requested, wherein, when the teleoperator in the respective blockade situation has decided that the vehicle shall wait, a time duration until the respective blockade situation has been resolved has been determined and has been learned as the probable blockade time duration of this blockade situation.

6. The method of claim 5, wherein the different blockade situations include several blockade situations of a similar kind and different time durations until the several blockade situations have been resolved, and wherein an average time duration until the several blockade situations have been resolved has been learned as the probable blockade time duration of this kind of blockade situation.

7. The method of claim 1, wherein the vehicle determines whether the support by the teleoperator is to be requested when the blockade situation is caused by at least one stationary emergency vehicle with activated blue lights, by a barrier, or by an unknown obstacle, and the vehicle requests support by the teleoperator when the blockade situation is caused by the at least one stationary emergency vehicle with activated blue lights, by the barrier, or by the unknown obstacle.

8. The method of claim 1, wherein the blockade situation and a position of the blockade situation is stored on a digital map and considered in future route planning for the vehicle.

\* \* \* \* \*